(12) United States Patent
Davis

(10) Patent No.: US 6,169,487 B1
(45) Date of Patent: Jan. 2, 2001

(54) SEVERE STORM WARNING SYSTEM

(76) Inventor: Robert B. Davis, P.O. Box 1287, Welaka, FL (US) 32193-1287

( * ) Notice: Under 35 U.S.C. 154(b), the term of this patent shall be extended for 0 days.

(21) Appl. No.: 09/459,330

(22) Filed: Dec. 13, 1999

(51) Int. Cl.[7] .................................................. G01W 1/00
(52) U.S. Cl. .................. 340/601; 73/170.16; 73/170.22; 73/718; 73/724; 73/700
(58) Field of Search .............................. 340/601; 73/700, 73/170.16, 170.22, 718, 724

(56) References Cited

U.S. PATENT DOCUMENTS

| | | | |
|---|---|---|---|
| 2,723,388 | * 11/1955 | Jacobs | 340/236 |
| 3,594,753 | * 7/1971 | Elenbaas | 340/236 |
| 3,603,951 | * 9/1971 | Bracken | 340/224 |
| 3,631,435 | * 12/1971 | Elenbass | 340/236 |
| 3,645,135 | * 2/1972 | Hadley | 73/398 |
| 3,717,861 | * 2/1973 | Wright, Jr. | 340/236 |
| 4,197,743 | * 4/1980 | Dauphinee | 73/384 |
| 4,292,659 | * 9/1981 | Lao | 361/283 |
| 4,302,973 | * 12/1981 | Yoshino et al. | 73/384 |
| 4,390,925 | * 6/1983 | Freud | 361/283 |
| 4,523,474 | * 6/1985 | Browne et al. | 73/724 |
| 4,754,647 | * 7/1988 | Clarke | 73/754 |
| 4,987,782 | * 1/1991 | Shkedi et al. | 73/718 |
| 5,178,010 | * 1/1993 | Holzel | 73/384 |
| 5,317,918 | * 6/1994 | Lew | 73/718 |
| 5,612,667 | * 3/1997 | Trumpy et al. | 340/425.5 |

* cited by examiner

Primary Examiner—Jeffery A. Hofsass
Assistant Examiner—Son M. Tang
(74) Attorney, Agent, or Firm—Arthur G. Yeager

(57) ABSTRACT

A severe storm warning system includes an atmospheric pressure sensor utilizing an air-filled chamber with a first pressure sensor mounted between the interior of the chamber and the atmosphere and being located within the chamber interior and a second pressure sensor mounted between the interior of the chamber and the atmosphere and being located outside the chamber. Both sensors are formed of multiple-plate, floating plate capacitors which are movable in response to pressure changes. Electronic circuitry periodically determines what pressure changes have occurred and compares the changes to the changes associated with a predetermined signature of the type of severe storm being determined. Indicators including alarms are provided if a known sequence of pressure changes is detected.

18 Claims, 7 Drawing Sheets

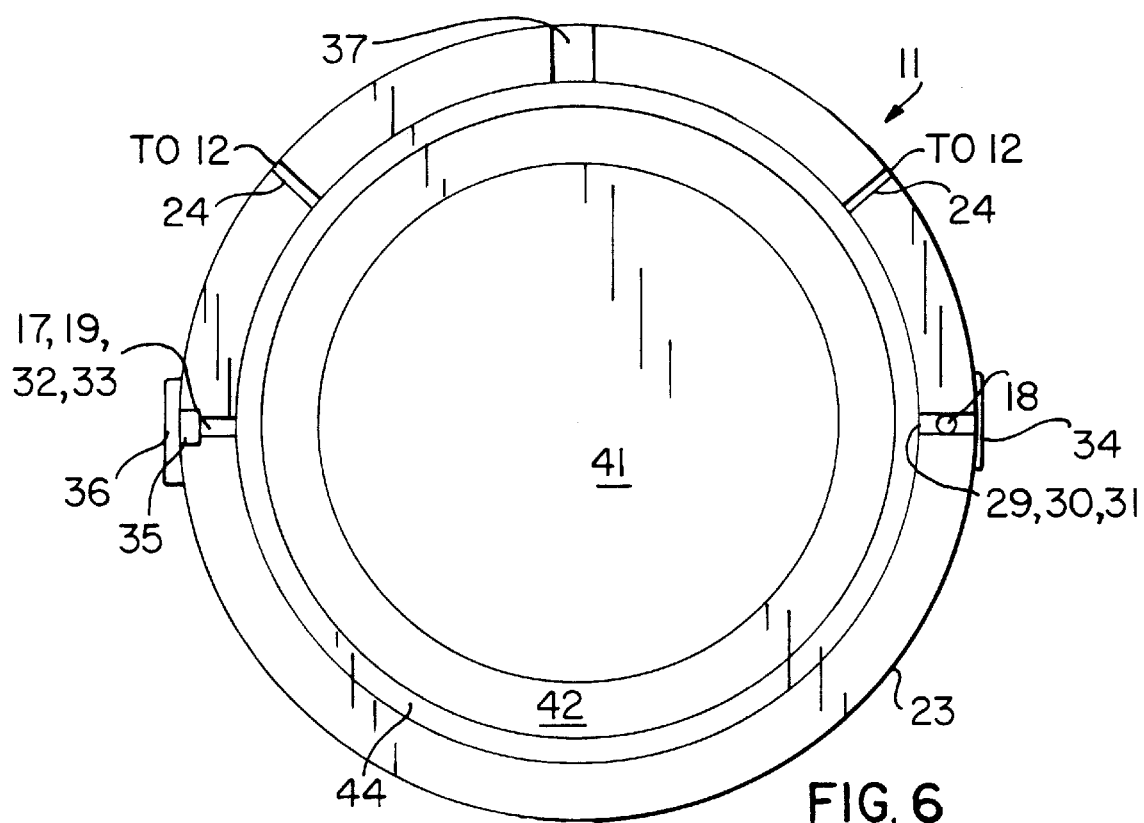
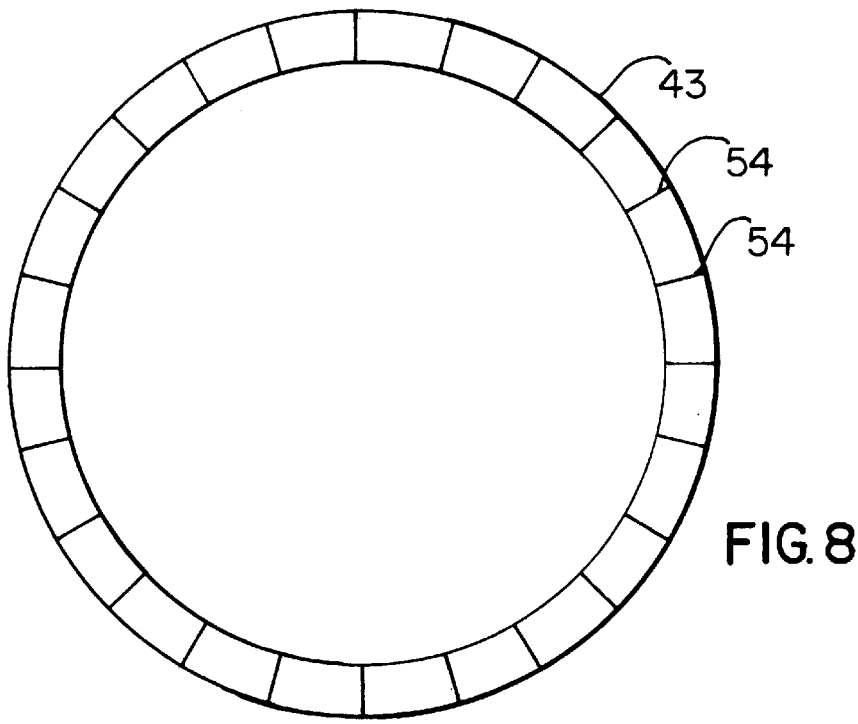

SEVERE STORM WARNING SYSTEM

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to atmospheric pressure sensors and storm warning indicators and particularly to personal storm warning systems.

2. Description of Related Art

U.S. Pat. No. 5,612,667 discloses a device that uses a motor vehicle, and related devices, to gradually track barometric pressure for the purpose of alarming at the approach of severe weather conditions over an extend historical time period.

The prior art also includes other devices, of both mechanical and electrical design, that are presented as severe storm warning devices. These units are complex and expensive and do not satisfy the individual need for a device that monitors atmospheric pressure stability, and then responds to adverse atmospheric pressure conditions in a timely manner. What is desired is a personal severe storm warning system. The device should be inexpensive, simple in construction, self-compensating, of rugged design, user friendly and is free standing with reasonable battery life. None of the prior art devices are satisfactory.

BRIEF SUMMARY OF THE INVENTION

In one aspect of the present invention there is provided a severe storm warning system that comprises an atmospheric pressure sensing means for sensing changes in atmospheric pressure, the sensing means includes a chamber having an air-filled interior space and a first pressure sensor mounted between the interior space and the atmosphere for comparing the pressure inside the chamber with the pressure of the atmosphere and providing an output signal indicative of the results of the comparison. The first pressure sensor includes a multiple-plate floating plate capacitor having spaced plates movable in response to changes in atmospheric pressure with respect to the pressure inside the chamber. The first pressure sensor is located inside the chamber.

In other aspects of the invention there is a second pressure sensor mounted between the interior space and the atmosphere for comparing the pressure inside the chamber with the pressure of the atmosphere and providing a second output signal indicative of the results of the comparison, the second pressure sensor being located outside the chamber. The second pressure sensor includes a multiple plate floating plate capacitor having spaced plates movable in response to changes in the atmospheric pressure with respect to the pressure inside the chamber. The sensing means includes memory means for remembering the output signal and also includes circuit means for periodically detecting the output signal for determining changes in atmospheric pressure during a time interval as determined by the circuit means. The circuit means includes memory means for remembering the output signals periodically detected by the circuit means. The sensing means includes indicator means for providing indication when the output signals remembered by the memory means are of predetermined values as established by the sensing means. The predetermined values established by the sensing means includes a plurality of sequences of changes in atmospheric pressure of a predetermined typical signature for the type of severe storm being determined.

In other aspects of the present invention there is provided in a severe storm warning system comprising atmospheric pressure sensing means for sensing changes in atmospheric pressure, the sensing means includes detector means for sequentially determining the atmospheric pressure at selected time intervals and providing an output signal indicative of the difference in atmospheric pressure detected during one time interval and the atmospheric pressure detected at an earlier time interval, indicating means responsive to the output signal for providing an indication when changes of a predetermined nature in atmospheric pressure have occurred as determined by the indicating means. The detector means includes at least one multi-plate floating plate capacitor having spaced plates movable in response to changes in atmospheric pressure for varying the capacitance of at least one capacitor. The detector means includes memory means for remembering the output signals. The sensing means includes a chamber having air filled interior space, the detector means determining the pressure in the chamber and outside the chamber. There is also a first pressure sensor located inside the chamber. Also included is a second pressure sensor mounted between the interior space and the atmosphere for comparing the pressure inside the chamber with the pressure of the atmosphere and providing a second output signal indicative of the results of the comparison, the second pressure sensor being located outside the chamber. The second pressure sensor mounted between the interior space and the atmosphere for comparing the pressure inside the chamber with the pressure of the atmosphere and providing a second output signal indicative of the results of the comparison, the second pressure sensor being located outside the chamber. The second pressure sensor includes a multiple-plate floating plate capacitor having spaced plates movable in response to changes in the atmospheric pressure with respect to the pressure inside the chamber. The sensing means includes circuit means for periodically detecting the output signal for determining changes in atmospheric pressure during a time interval as determined by the circuit means. The sensing means also includes indicator means for providing an indication when the output signals remembered by the memory means are of predetermined values as established by the sensing means. The predetermined values established by the sensing means includes a plurality of sequences of changes in atmospheric pressure of a predetermined typical signature for the type of severe storm being determined.

In other aspects of the invention there is provided in a severe storm warning system comprising an atmospheric pressure sensing means for sensing changes in atmospheric pressure, the sensing means includes a chamber having an air-filled interior space and a first and second pressure sensor each mounted between the interior space and the atmosphere for comparing the pressure inside the chamber with the pressure of the atmosphere and providing a respective first and second output signals indicative of the results of each comparison. Each said first and second pressure sensor includes a multiple-plate floating plate capacitor, the plates being movable in response to changes in atmospheric pressure with respect to the pressure inside the chamber. The first pressure sensor is located inside the chamber and the second pressure sensor is located outside the chamber.

BRIEF DESCRIPTION OF THE SEVERAL VIEWS OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 6 is a partial top view of the assembly of FIG. 4;

FIG. 8 is a top view of a pressure sensor spring of FIG. 5;

DETAILED DESCRIPTION OF THE INVENTION

Introduction

Figure 1:
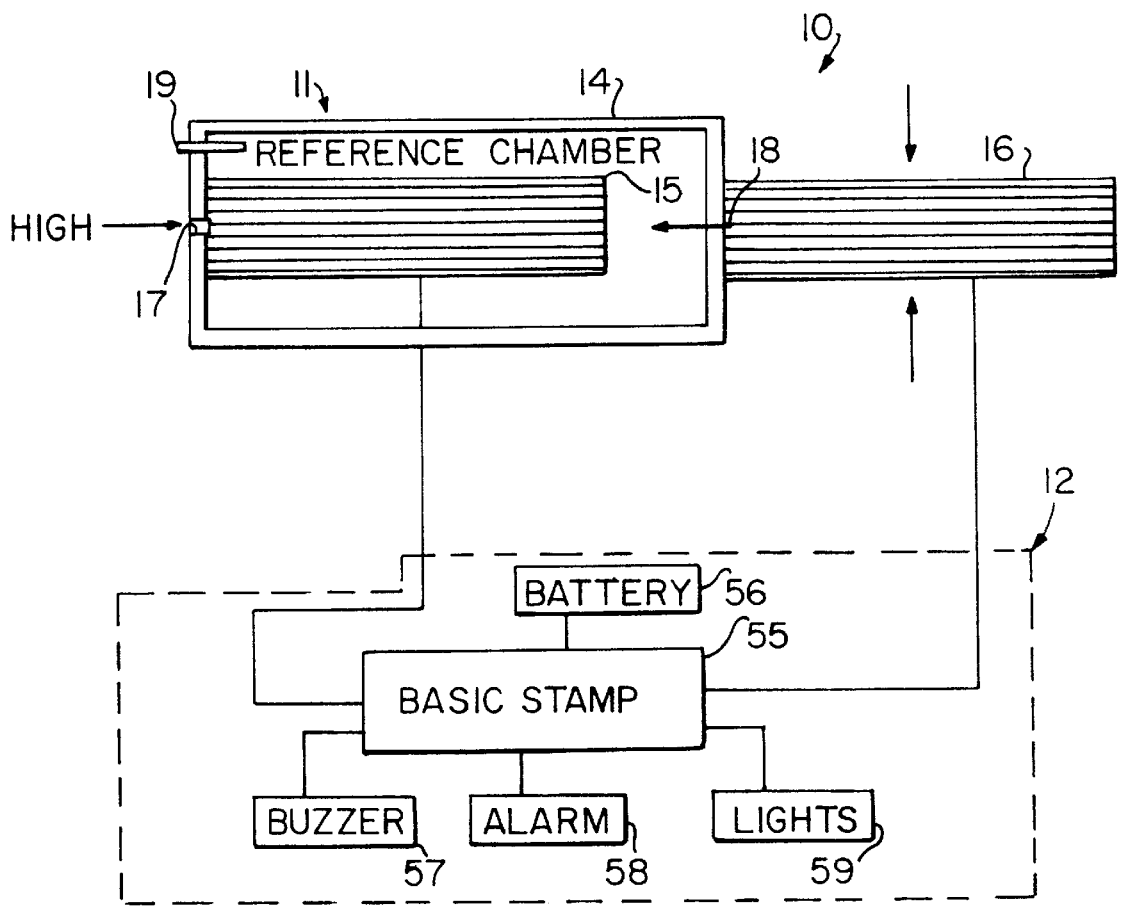
FIG. 1 is an operating diagram of the severe storm warning system in accord with the present invention.

This invention is a device that detects and calculates the differential pressure between the real time atmospheric pressure and the historical atmospheric pressure contained in a reference chamber. The device uses two variable, floating plate capacitors, that are acted upon by flexible diaphragms, to measure variations in atmospheric pressure. One of the variable, floating plate capacitors is active when the real time atmospheric pressure is greater than the historical reference chamber pressure; and the other variable floating plate capacitor is active when the atmospheric pressure is less than the historical reference chamber pressure. The historical reference chamber pressure is constantly being equalized to the real time atmospheric pressure by an orifice that leaks air into, or out of the chamber at a delayed rate.

The electronic value of the variable, floating plate capacitors are read by a computer program that uses a time reference to measure the electrical discharge of the capacitors through a resister. The computer program uses the difference between two variable, floating plate capacitor electrical values, separated by a time delay, to determine the rate-of-change of the atmospheric pressure.

The computer program compares the values received with preset alarm level set for the computer alarm looping program. These preset alarm values are formulated from historical storm testing data and are used to trigger the device alarm. Activation of the device alarm is an indication of the existence of atmospheric conditions favorable to possible adverse weather conditions.

At the end of each computer detection and/or alarm cycle, the program resets to zero and another series of time slice values are processed for alarm indications.

The device is fitted with an RCA plug for providing the device output values to an A/D converter that may be used to connect to other devices such as a computer.

The feasibility of the present invention was determined when a considerable amount of distinctive atmospheric pressure pulsing was detected prior to the arrival of a serious weather squall line. A sharp rise in atmospheric pressure followed, with the storm event arriving later in the time frame. The sudden increase in the pulsing of the atmospheric pressure prior to a serious storm event was selected for the alarm trigger of this invention.

When the system is turned on, it performs an operational self test an then starts a continuous atmospheric rate-of-change monitoring. The system constantly subjects two, dual diaphragm operated, variable, floating plate, capacitors connected to atmospheric pressure. One variable capacitor has atmospheric pressure ducted to the space between the capacitor operating diaphragms, with the external surface of the same diaphragms being subject to the pressure in a historical reference chamber. The other variable, floating plate, capacitor has reference chamber pressure ducted to the space between the capacitor operating diaphragms, with the external surface of the same diaphragms being subjected to the atmospheric pressure.

Pulses in the atmospheric pressure, greater than or less than the historical reference chamber pressure, will cause one of the variable capacitors to compress and increase in electronic value; and the other to decompress and decrease in electronic value.

Each variable, floating plate capacitor is connected by a pair of wires to a circuit board that has a programmable language called PBASIC programmed to read the electrical value of each variable capacitor by timing the discharge time,through a fixed resistor. The program uses integer math for all calculations and no values less than one are calculated. The power supply is a 9 volt battery.

The PBASIC program reads the values of each variable capacitor and stores the value in a memory. After a time delay of 10 milliseconds, the program reads the variable capacitors again and calculates the rate of change over the time delay with integer mathematics. These rate-of-change calculations are summed and stored in a single memory and a loop counter is increased one integer. The program is attached hereto as Appendix "A". An accompanying flow chart is Appendix "B".

Construction

With respect to the drawings, the atmospheric pressure deviation sensor according to the invention is illustrated at numeral 10 in FIG. 1. Sensor assembly 11 is shown pictorially and includes a reference chamber 14 housing a sensor 15 that provides electrical signals to processing assembly 12. Another sensor 16 is subject to atmospheric pressure as indicated by the arrows and is connected to reference chamber 14 via duct 18. Sensor 15 is connected to the atmosphere via duct 17. Pressure inside the reference chamber is controlled by wick vent 19 that functions as a very small orifice.

As atmospheric pressure increases to "high"—a value higher that it has been in the immediate past—sensor 15 provides an output signal to processing assembly 12. At the same time, sensor 16 also sends a signal output to assembly 12 where electric circuitry and a computer program will process the output signals.

Figure 2:
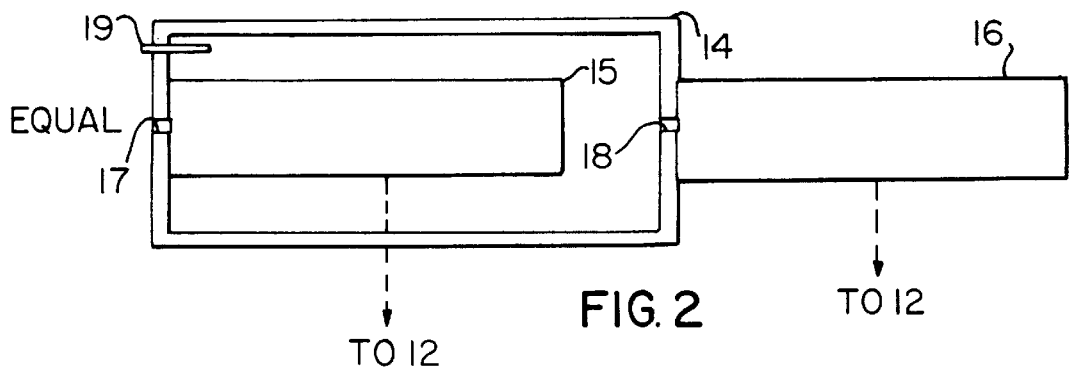
FIGS. 2 and 3 are operating diagrams of the-sensors of FIG. 1.
Figure 3:
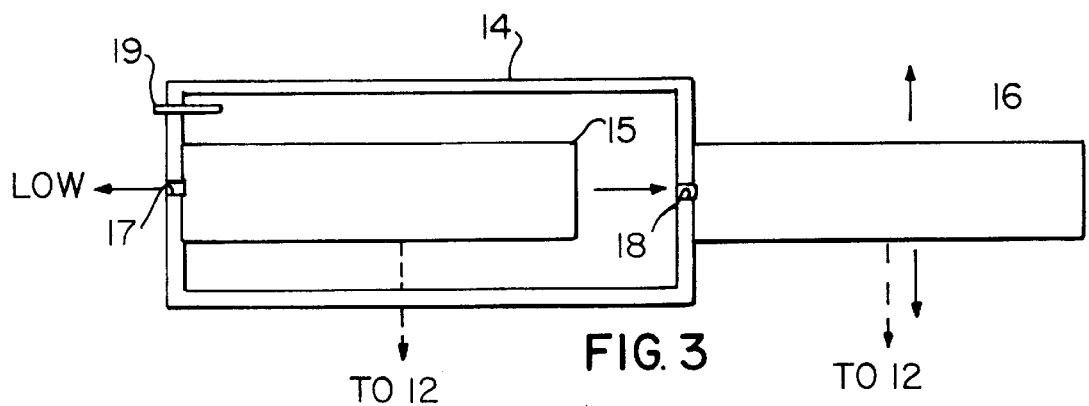

FIGS. 2 and 3 are pictorial illustrations of the sensors 15 and 16 of FIG. 1 with different atmospheric conditions. FIG. 2 represents a steady state condition. FIG. 3 represents a condition where the atmospheric pressure has dropped in the past few minutes. Wick vent 19 can be adjusted to equalize pressure in the reference chamber 14 with atmospheric pressure in the range of approximately 10–60 seconds as desired.

Figure 4:
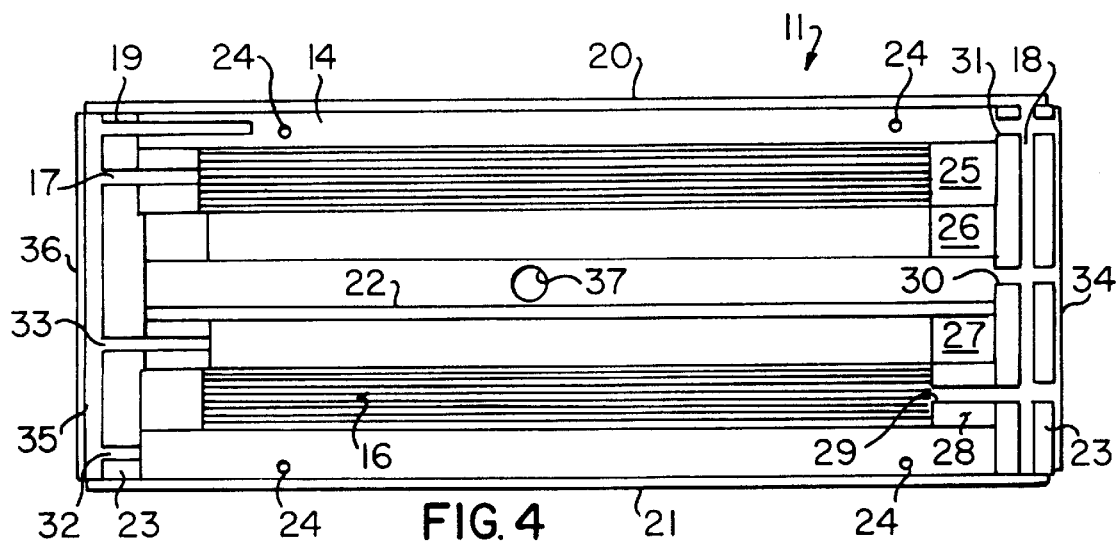
FIG. 4 is a cut-away pictorial illustration of the pressure sensing assembly in accord with the present invention.

FIG. 4 illustrates a pictorial cross-sectional view of the sensor assembly 11 as actually constructed. Plastic cover plates 20, 21 and plastic partition wall 22 define the interior spaces of body 23 which is a section of PVC pipe which is a 3 inch coupling and approximately 4 inches in diameter. Reference chamber 14 is defined by upper cover plate 20. Housing 23 and partition wall 22. Pressure sensor 15 has a sensor ring 25 that is glued to a sensor support ring 26 that is mounted via silicone to the interior side of housing 23. One end of sensor 15 has duct 17 drilled through ring 25 and housing 23. Wick vent 19 is a section of insulated stranded #22 AWG copper wire mounted through housing 23. Output wire holes 24 provide electrical connections between sensors 15 and 16 and circuitry 12.

Below partition wall 22, sensor 16, having sensor ring 28, is mounted to sensor support ring 27 attached with silicone to housing 23. Duct 29 drilled through ring 28 is the same as duct 17. Both sensors 15 and 16 are constructed to be as identical as practically possible. In addition, the sensor assembly 11 is shown horizontally for ease of illustration. In practice, the sensors 15 and 16 will be positioned vertically as will be discussed hereinbelow.

The reference chamber 14 is connected to reference chamber header duct 18 which includes ducts 29 to sensor 16 and ducts 30 and 31 to opposite sides of sensor 15. In practice, header duct 18 is formed by drilling through housing 23 top to bottom and then drilling horizontally through housing 23 to form ducts 29, 30, and 31. Accordingly, the ends of header 18 are sealed by cover plates 20, 21 which are secured via a bead of silicone (not shown) and a piece of duct tape 34 on the outside as shown.

At the other side of housing 23 a groove 35 is cut to connect the ducts to atmosphere 17, 19, 32, 33 in a manner whereby a filter 36 can be used to protect the interior of housing 23 from dust and debris. Test hole 37 is used for testing and shipping and is normally sealed closed with a cap screw (not shown).

Figure 5:
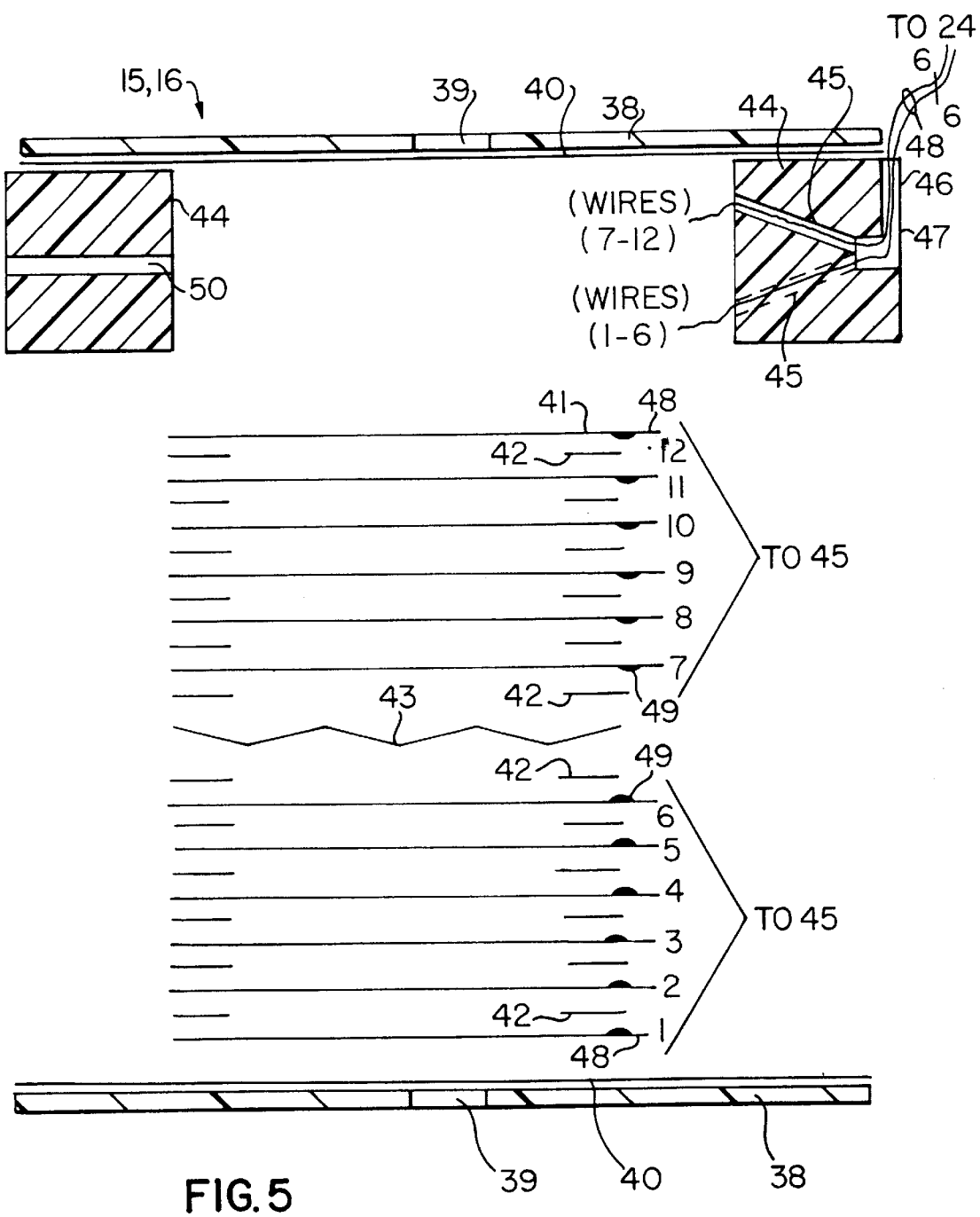
FIG. 5 is a partially exploded view of a sensor of FIG. 4.

FIG. 5 is a partially exploded pictorial view of a single sensor 15 or 16 which are constructed to be identical. Diaphragm stop plates 38 have center holes 39 to allow air pressure to push on mylar diaphragms 40. The floating plate capacitors used in the sensors 15, 16 are illustrated as numbered for convenience. Twelve thin metal plates 41 are stacked into two groups of six plates forming two variable capacitances.

Spacers 42 are circular rings made of insulating material. The plates 41 are covered on one side by an insulating plastic material that also covers solder connection 49 to which individual copper wires 48 are attached on one side of a plate 41. Pressure sensor spring 43 provides for separation and mechanical balancing of the plates 41 as will be discussed hereinbelow. Diaphragm stop plates 38 limit the travel of plates 41 and are secured to diaphragms 40 and ring 44 with contact cement.

Sensor ring 44 has duct 50 and two wire holes 45, one tilted upwardly and the other holes are for the output wires 48 from the twelve capacitor plates 41 in a sensor. A hole 50 is a vent and indicated by one of the markings 52 that function as a guide to installation of the ring 44 and the plates 41 with the attached wires 48. Holes labeled "C" are used in the assembly process for holding the spring-loaded plates 41 in place while the diaphragm 40 and stop plate 38 are mounted and sealed with contact cement. Copper wires are temporarily mounted across the plates 41 between two "C" holes and one "C" hole and vent hole 50. When assembly is complete the additional wires are removed and all holes but vent 50 are sealed closed with silicone.

Wires 48 are collected and soldered downwardly as a matter of fabrication convenience. Seal hole 47 is filled with silicone or other sealant upon completion of running the wires 48 through vertical slot 46. Wires 48 form two 6-wire bundles.

FIG. 6 illustrates a top view of the assembly 11 showing the relative position of several features of the sensor assembly 11.

Figure 7:
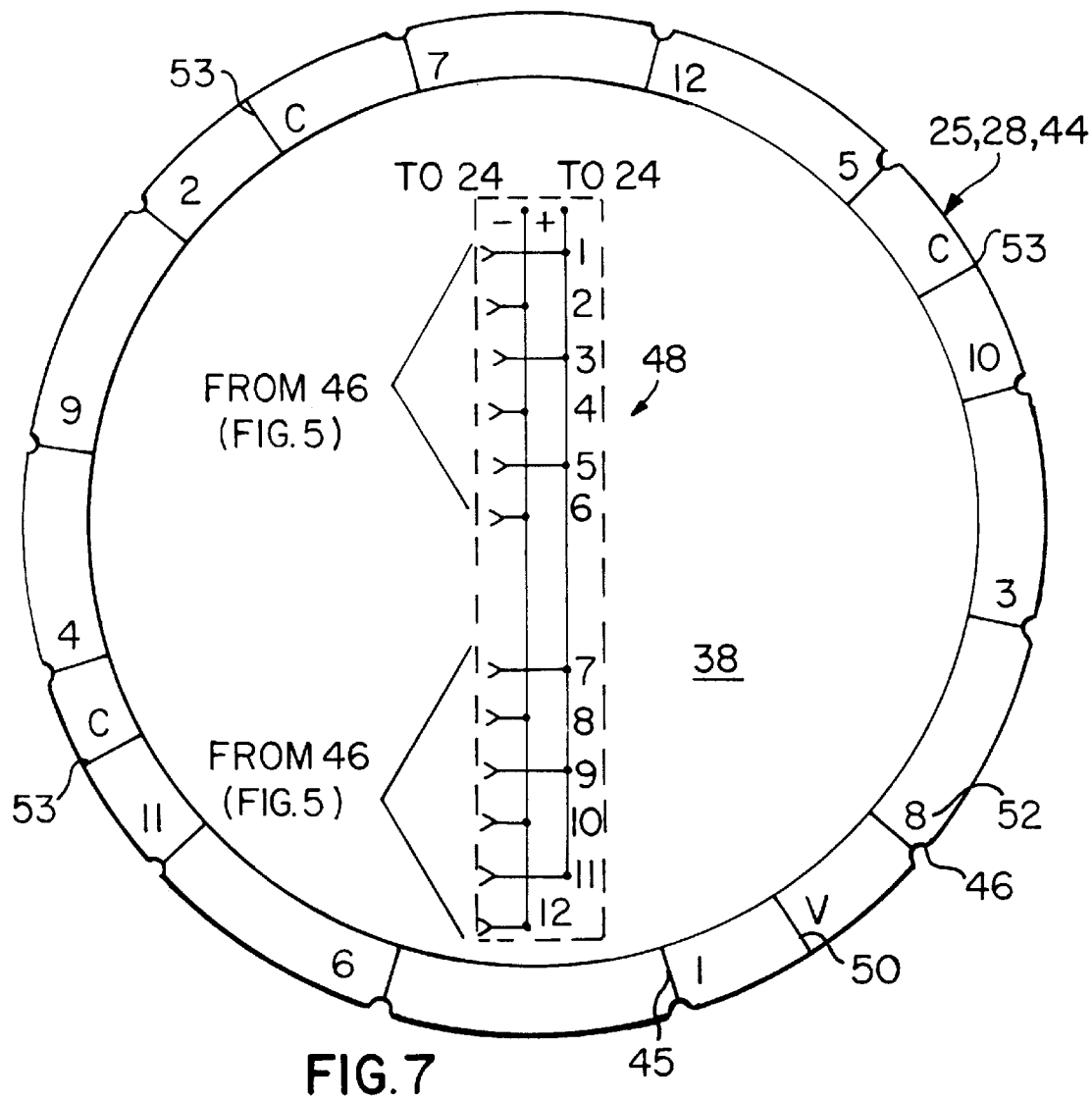
FIG. 7 is a top view of a pressure sensor ring of FIG. 4.

FIG. 7 illustrates a top view of a sensor ring and its relation to the output signal wiring. The ring 25, 28 or 44 is formed of a section of PVC pipe and is attached inside of housing 23. The ring 44 has 16 holes drilled through it. Twelve of the as shown. The two output wires are fitted through holes 24 as illustrated in FIG. 6. Sensor rings 25, 28 are mounted in sections of interior housing that have been cut out. This allows for silicone between the exterior surface of the rings and the housing to provide for sufficient elasticity to prevent ambient temperature changes from adversely affecting sensor operation.

Sensor spring 43 is illustrated in FIG. 8. The spring 43 consists of a planar ring of copper similar to that of capacitor plates 41. A sheet metal break is used to create alternating pleats or creases 54 that result in a sawtooth-like profile.

Figure 9:
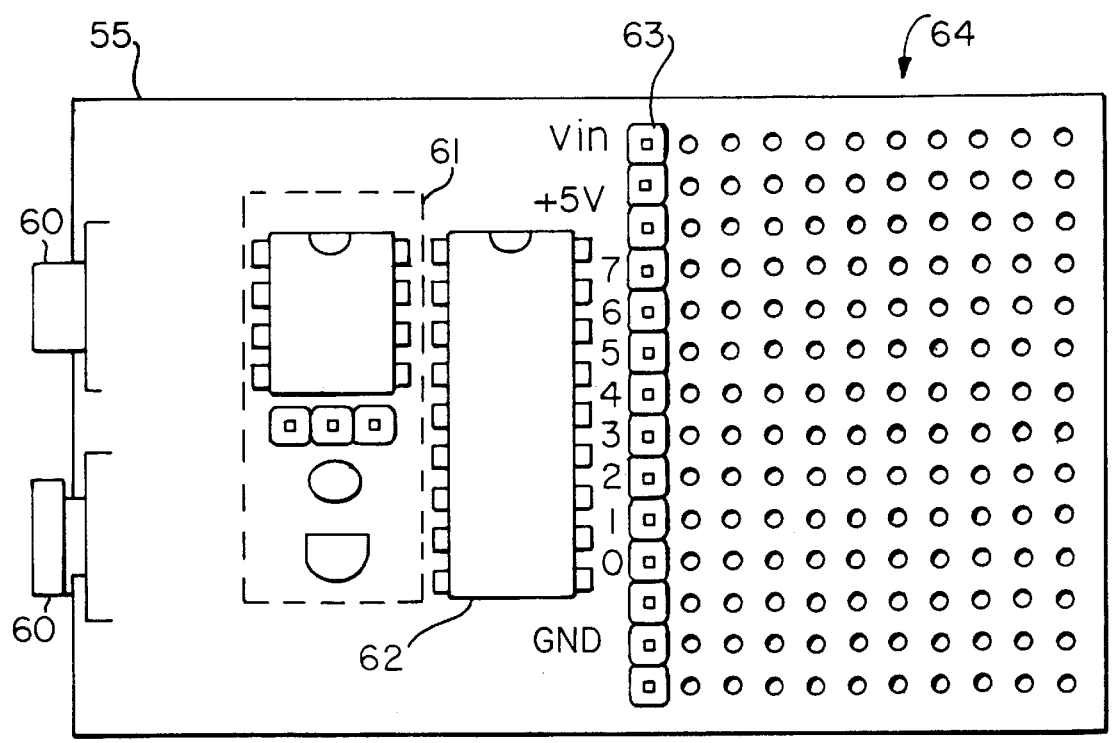
FIG. 9 is a diagram of the circuit board used in the signal processing circuitry of FIG. 1.

FIG. 9 illustrates the basic stamp circuit board 55 (a product of Parallax, Inc. of California). The board 55 includes 9 volt battery clips 60, programming input circuitry 61, RAM-based PBASIC language chip 62 which is connected to input/output header 63, and a prototyping area for user-selectable circuits.

Figure 10:
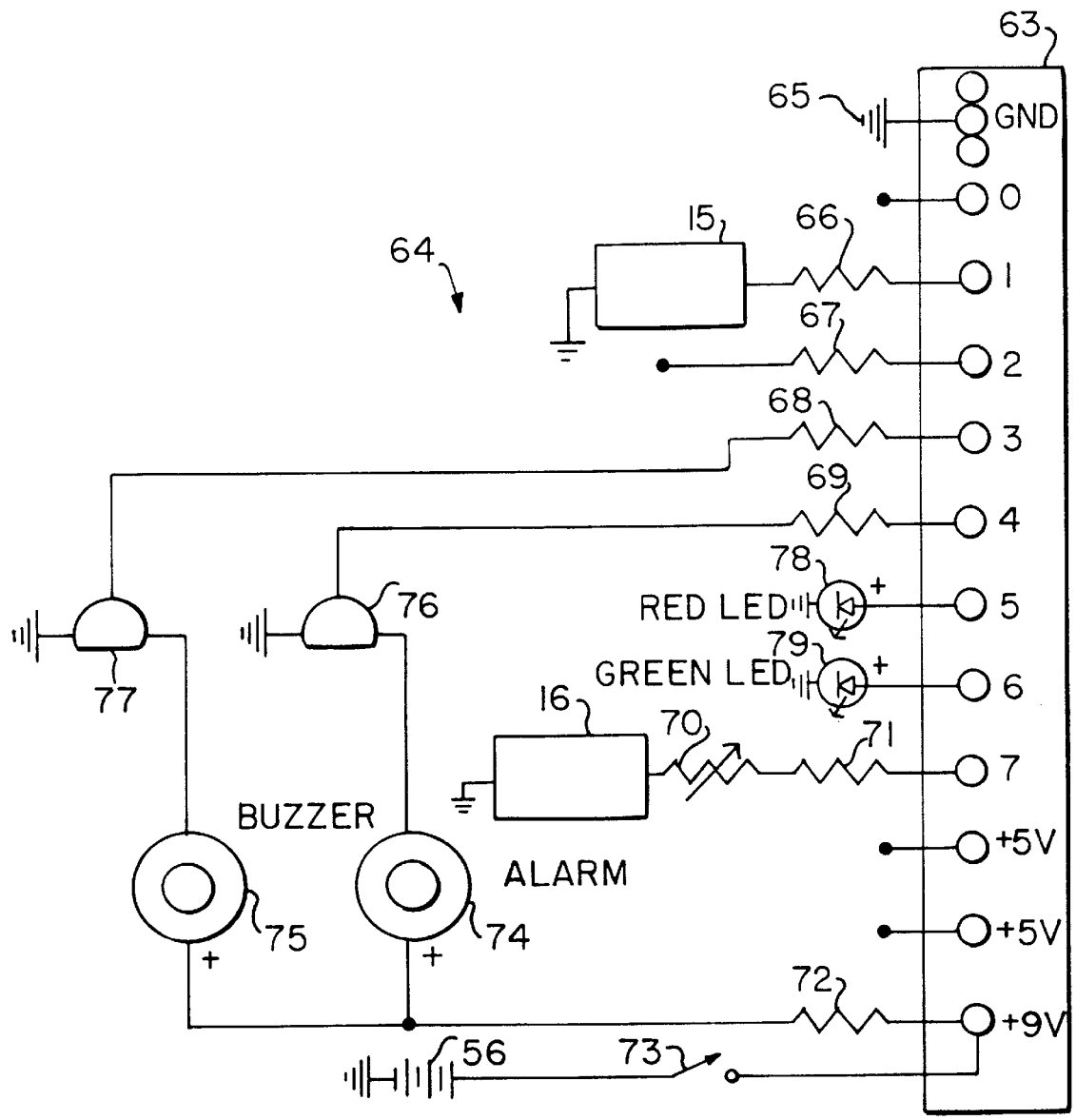
FIG. 10 is a partial schematic diagram of the processing circuitry used with the circuit board of FIG. 9.

FIG. 10 illustrates the circuitry used in the present invention in prototyping area 64. Circuit ground 65 is attached at pin GND. Resistors 66–72, switch 73, whistle alarm 74, buzzer 75, transistors 76–77 and LED's 78 and 79 are all standard components known in the art.

Pin 1 connects to negative pressure sensor 15 located in reference to chamber 14. Pin 2 is an optional connection to chart recorders and other equipment as desired. Pin 7 connects to positive pressure sensor 16 via calibration resistor 70.

To operate the system:
1. Set the housing 23 on end and turn the rocker switch 73 ON.
2. The system 10 will perform as follows;
   a) The device will test the lights 78, 79 and the alarms 74, 75.
   b) The device will initialize memory.
3. Low atmospheric pressure wave activity will be indicated by a flash of the green light 79 every 17 seconds.
4. Medium atmospheric pressure wave activity will be indicated by a single signal from red light 78 every 4 seconds with an occasional sound of buzzer 75.
5. Strong atmospheric wave activity will be indicated by 10 sounds of the electronic whistle 74.
6. At the end of each alarm cycle the device will reset to the detection mode. To test the device when it is operating, turn switch 73 OFF and wait 30 seconds. Turn the device ON.
7. Low battery voltage will be indicated by a chirping of whistle 74.

While the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

What is claimed as new and what it is desired to secure by Letters Patent of the United States is:

1. In a severe storm warning system comprising an atmospheric pressure sensing means for sensing changes in atmospheric pressure, said sensing means including a chamber having an air-filled interior space and a first pressure sensor located inside said chamber and being mounted between said interior space and the atmosphere for comparing the pressure inside said chamber with the pressure of the atmosphere and providing an output signal indicative of the results of the comparison, said first pressure sensor including a multiple-plate floating plate capacitor having spaced plates movable in response to changes in atmospheric pressure with respect to the pressure inside said chamber and a second pressure sensor located outside said chamber and being mounted between said interior space and the atmosphere for comparing the pressure inside said chamber with the pressure of the atmosphere and providing a second output signal indicative of the results of the comparison.

2. The system as defined in claim 1 wherein said second pressure sensor includes a multiple-plate floating plate capacitor having spaced plates movable in response to changes in the atmospheric pressure with respect to the pressure inside said chamber.

3. The system as defined in claim 1 wherein said sensing means includes memory means for remembering said output signal.

4. The system as defined in claim 1 wherein said sensing means includes circuit means for periodically detecting said output signal for determining changes in atmospheric pressure during a time interval as determined by said circuit means.

5. The system as defined in claim 4 wherein said circuit means includes memory means for remembering said output signals periodically detected by said circuit means.

6. The system as defined in claim 5 wherein said sensing means includes indicator means for providing indication when said output signals remembered by said memory means are of predetermined values as established by said sensing means.

7. The system as defined in claim 6 wherein said predetermined values established by said sensing means includes a plurality of sequences of changes in atmospheric pressure of a predetermined typical signature for the type of severe storm being determined.

8. In a severe storm warning system comprising atmospheric pressure sensing means for sensing changes in atmospheric pressure, said sensing means including detector means for sequentially determining the atmospheric pressure at selected time intervals and providing an output signal indicative of the difference in atmospheric pressure detected during one said time interval and the atmospheric pressure detected at an earlier said time interval, indicating means responsive to said output signal for providing an indication when changes of a predetermined nature in atmospheric pressure have occurred as determined by said indicating means, said detector means including at least one multi-plate, floating plate capacitor having spaced plates movable in response to changes in atmospheric pressure for varying the capacitance of said at least one capacitor.

9. The system as defined in claim 8 wherein said detector means includes memory means for remembering said output signals.

10. The system as defined in claim 9 wherein said sensing means includes indicator means for providing an indication when said output signals remembered by said memory means are of predetermined values as established by said sensing means.

11. The system as defined in claim 10 wherein said predetermined values established by said sensing means includes a plurality of sequences of changes in atmospheric pressure of a predetermined typical signature for the type of severe storm being determined.

12. The system as defined in claim 8 wherein said sensing means includes a chamber having air filled interior space, said detector means determining the pressure in said chamber and outside said chamber.

13. The system as defined in claim 12 further including a first pressure sensor, said first pressure sensor being located inside said chamber.

14. The system as defined in claim 13 further including a second pressure sensor mounted between said interior space and the atmosphere for comparing the pressure inside said chamber with the pressure of the atmosphere and providing a second output signal indicative of the results of the comparison, said second pressure sensor being located outside said chamber.

15. The system as defined in claim 14 wherein said second pressure sensor includes a multiple-plate, floating plate capacitor having spaced plates movable in response to changes in the atmospheric pressure with respect to the pressure inside said chamber.

16. The system as defined in claim 8 wherein said sensing means includes circuit means for periodically detecting said output signal for determining changes in atmospheric pressure during a time interval as determined by said circuit means.

17. In a severe storm warning system comprising an atmospheric pressure sensing means for sensing changes in atmospheric pressure, said sensing means including a chamber having an air-filled interior space and a first and second pressure sensor each mounted between said interior space and the atmosphere for comparing the pressure inside said chamber with the pressure of the atmosphere and providing a respective first and second output signals indicative of the results of each comparison, each said first and second pressure sensor including a multiple-plate floating plate capacitor, said plates being movable in response to changes in atmospheric pressure with respect to the pressure inside said chamber.

18. The system as defined in claim 17 wherein said first pressure sensor is located inside said chamber and said second pressure sensor is located outside said chamber.

* * * * *